United States Patent

[11] 3,609,291

| [72] | Inventors | Frank J. Pilia<br>Short Hills;<br>John F. Saenger, Jr., Springfield, both of N.J. |
|---|---|---|
| [21] | Appl. No. | 849,824 |
| [22] | Filed | Aug. 13, 1969 |
| [45] | Patented | Sept. 28, 1971 |
| [73] | Assignee | Union Carbide Corporation<br>New York, N.Y. |

[54] ARC WELDING CONTROL SYSTEM FOR A MANUAL TORCH
2 Claims, 2 Drawing Figs.

[52] U.S. Cl. .................................................. 219/131 R,
219/130, 219/132
[51] Int. Cl. .................................................. B23k 9/10
[50] Field of Search .......................................... 219/131,
132, 135, 130

[56] References Cited
UNITED STATES PATENTS

| 2,808,499 | 10/1957 | Anderson | 219/135 |
| 2,929,917 | 3/1960 | Kruml et al. | 219/135 |
| 3,133,225 | 5/1964 | Lobosco et al. | 219/131 F |
| 3,274,371 | 9/1966 | Manz et al. | 219/130 |
| 3,369,146 | 2/1968 | Adamson | 219/131 |
| 3,459,996 | 8/1969 | Adamson et al. | 219/135 |

Primary Examiner—J. V. Truhe
Assistant Examiner—George A. Montanye
Attorneys—Paul A. Rose, Thomas I. O'Brien, Dominic J. Terminello and Eugene Lieberstein ABSTRACT: A control system for a manually operated welding torch housing a nonconsumable electrode and a consumable wire electrode including a power supply having a DC and AC output, the DC output being connected in circuit relation with the nonconsumable electrode and a workpiece, the AC output being connected in circuit relation with the consumable electrode and the workpiece, feeding means for the consumable electrode, and a single manually operated selector switch which controls both the delivery of power to the consumable and nonconsumable electrode and the consumable electrode feeding means.

INVENTORS
JOHN F. SAENGER JR.
FRANK J. PILIA
BY
ATTORNEY

3,609,291

ARC WELDING CONTROL SYSTEM FOR A MANUAL TORCH

This invention relates to a welding control system for use with inert-gas nonconsumable metal arc-welding apparatus and more particularly to a control system for a manually operated welding torch which houses a nonconsumable arc electrode and a consumable wire electrode.

The conventional gas-tungsten-arc (GTA) welding process has heretofore been generally considered uneconomical for joining metal plate or for welding with filler metal at high speed. It has recently been discovered that the effective speed of GTA welding may be substantially increased without sacrificing welding quality by feeding a consumable filler wire electrode into the weld puddle in accordance with the "arcless" deposition process as taught in U.S. Pat. No. 3,122,629 filed Feb. 2, 1962, in the name of August F. Manz. The consumable filler wire electrode is continuously melted into the weld puddle by $I^2R$ heating alone and will be hereinafter referred to as a consumable "hot wire." Where, for manual welding, both the GTA and "hot-wire" operations are combined it is important that the proper operational sequence be under a simple control requiring little skill to operate.

Accordingly, it is the primary purpose of the present invention to provide an arc control system for carrying out a manual GTA hot-wire operation.

It is a further object of the present invention to provide an arc control system for carrying out a manual TIG hot-wire operation which may be hand operated by means of a pushbutton located in the torch or foot controlled by means of a foot pedal.

Other advantages and objects of the present invention will be pointed out or will become apparent from the description and drawings in which.

Figure 1:
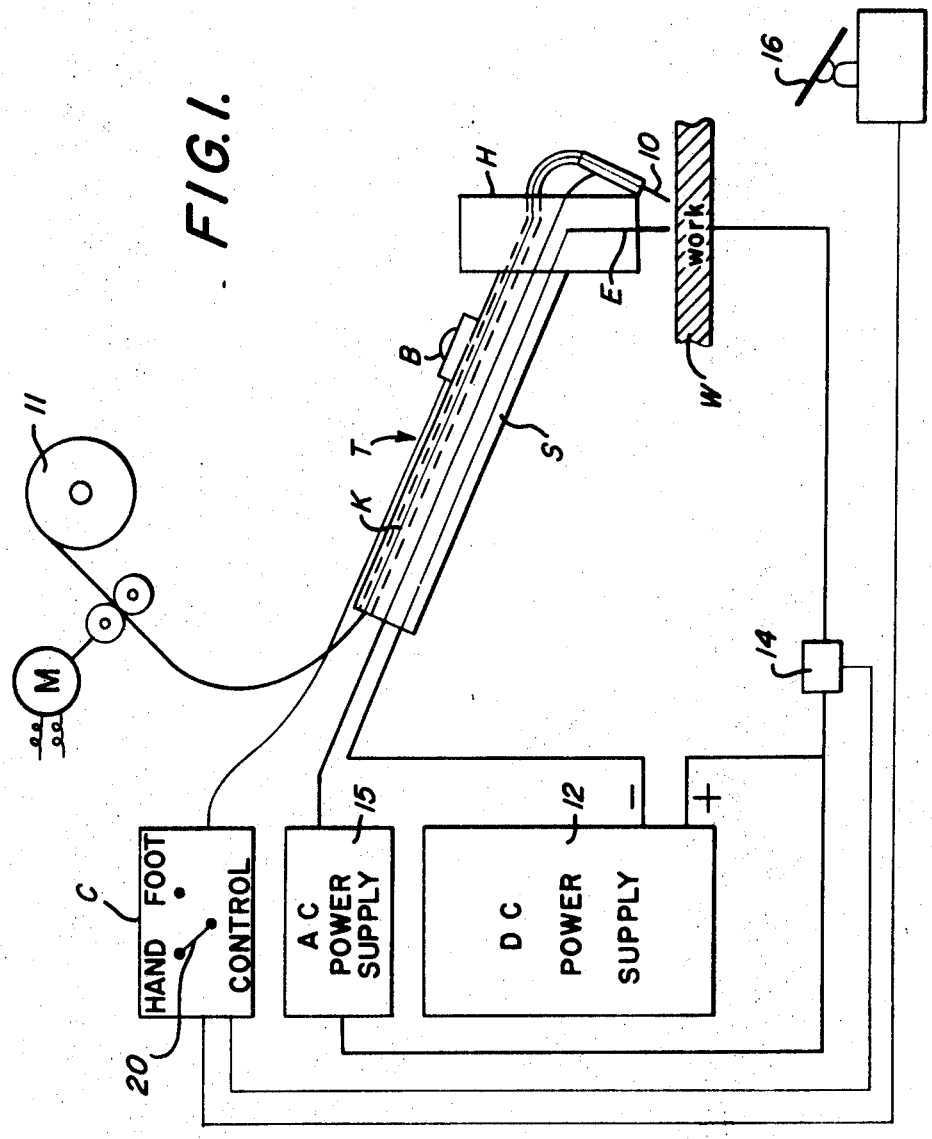
FIG. 1 is a schematic diagram illustrating the apparatus for practicing the invention.

Referring now to FIG. 1 in which is shown a manually operable torch T having a handle or shank portion S on which is located a pushbutton B. A nonconsumable electrode E of preferably tungsten 2 percent thoria extends from the head portion H of torch T. Torch T also includes a conduit K through which a consumable "hot-wire" electrode 10 is controllably fed from spool 11 in a direction toward and into direct contact with the work W to be welded. The hot-wire feed control circuitry and the torch T control circuitry is embodied in control system C. A DC arc power supply 12 is connected across the torch T and work W to supply power to the nonconsumable electrode E. The negative terminal of DC power supply 12 is connected to torch T while the positive terminal thereof is connected to the work W through a weld current relay 14. An AC power supply 15 of preferably constant potential is electrically coupled to the consumable hot-wire electrode 10 and to the work W through a weld current relay 14. Although two separate power supplies are shown for providing AC and DC power it is to be understood that both supplies may be contained in a single enclosure having a DC and an AC output. A two position selector switch 20 provides a welding operator the option of using either a foot control mode of operation or a hand control mode of operation. The foot control pedal is symbolically illustrated at 16.

Figure 2:
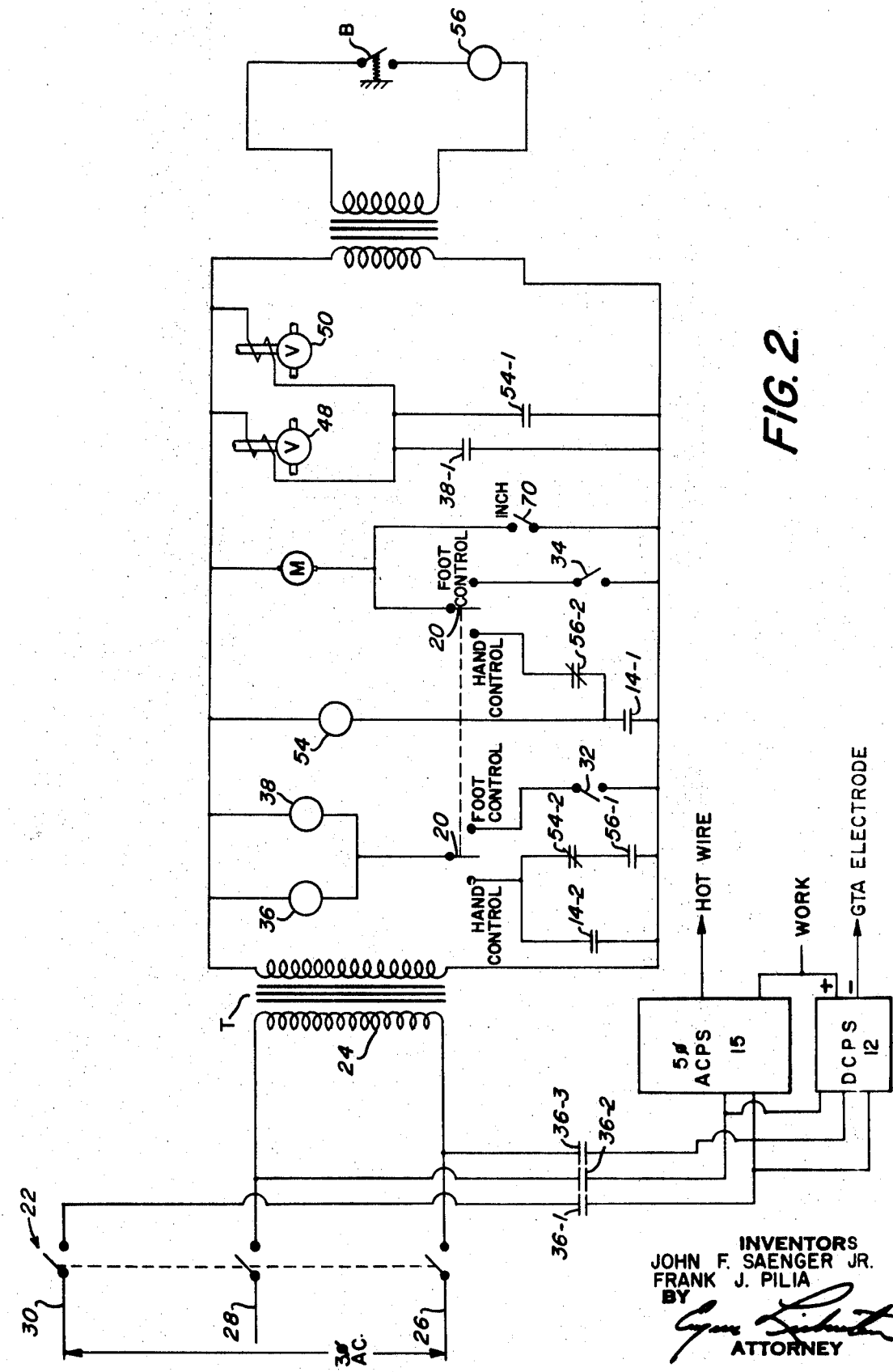
FIG. 2 is a circuit wiring diagram of the control system illustrated in block form in FIG. 1.

Referring now more specifically to FIG. 2, showing the control circuitry of the present invention; line voltage is derived from a three phase source of supply (not shown) having single phase output leads 26, 28 and 30, respectively. The primary winding 24 of transformer T is connected to leads 26 and 28 of the three phase supply through contacts of main line switch 22. Closing main line switch 22 will provide line voltage for the entire system. The foot control mode of operation is established by moving selector switch 20 to the foot control position. The foot control pedal 16 shown in FIG. 1 sequentially actuates two microswitches 32 and 34 in response to increasing amounts of applied foot pressure. Depressing foot pedal 16 slightly will close microswitch 32 energizing the weld contactor relay 36 and the weld start relay 38. Once the weld contactor relay 36 is energized its normally open relay contacts 36-1, 36-2 and 36-3 will close thereby supplying line voltage from the three phase line source to the DC and AC power supplies 12 and 15, respectively.

With weld start relay 38 energized contact 38-1 closes energizing the gas and water solenoids 48 and 50, respectively, for supplying, in a conventional manner, shielding gas and cooling fluid to torch T. The GTA welding arc may then be struck by scratching the nonconsumable tungsten electrode E against the surface of the work W or by any other conventional means such as high frequency. Weld current relay 14, shown in FIG. 1, responds to the flow of arc current energizing when the current flow exceeds a predetermined magnitude. Hence, when an arc is established between the nonconsumable tungsten electrode E and the work W, sufficient current will flow to energize weld current relay 14. Once weld current relay 14 is energized its normally open contact 14-1 closes which in turn activates the post flow time delay relay 54. Normally open contact 54-1 of time delay relay 54 closes after a predetermined time delay locking in gas and water solenoids 48 and 50, respectively. A time delay relay, as its name implies, pulls up its contacts when energized after a predetermined period of time has elapsed and releases them when deenergized after a substantially equal delay period.

The manual welding operation may now be started in a conventional manner moving the torch relative to the work. The hot wire 10 may be brought into operation at the will of the operator by merely depressing foot pedal control 16 completely down to activate microswitch 34. With microswitch 34 closed, motor M energizes causing the hot wire 10 to be fed at a predetermined rate into direct contact with the work W. The hot wire will be continuously consumed by $I^2R$ heating alone, as taught in U.S. Pat. No. 3,122,629, referred to earlier. AC power is applied to hot wire 10 from power supply 15. The welding operator may interrupt the hot-wire feed by raising slightly foot pedal 16, thus opening microswitch 34. The hot wire 10 may be intermittently fed, if desired, by depressing the foot pedal all the way down and releasing it slightly in an intermittent manner. To stop welding the foot pedal would be released completely disengaging microswitches 32 and 34, which will halt the hot-wire feed and deenergize weld contactor relay 36 thereby opening relay contacts 36-1, 36-2 and 36-3 to interrupt line voltage from power supplies 12 and 15. Time delay relay 54 will hold in contact 54-1 for a predetermined delay period thus providing post flow gas and water coverage for a short time as a safety measure.

When welding in areas where foot control operation is inconvenient, the welding operator can transfer operation to hand control. In the hand control mode of operation, pushbutton B located on the torch handle is depressed energizing torch switch transfer relay 56 thereby closing normally open contact 56-1 and simultaneously opening normally closed contact 56-2. When normally open contact 56-1 closes, the weld contactor relay 36 and the weld start relay 38 are energized through the normally closed contact 54-2 of the post flow time delay relay 54. Contacts 36-1, 36-2 and 36-3 of weld contactor relay 36 immediately close, supplying line voltage to power supplies 12 and 15 in the same manner discussed heretofore with respect to the foot control mode of operation. Energization of weld start relay 38 closes contact 38-1 energizing the gas and water solenoids 48 and 50, respectively, for supplying gas and cooling fluid for torch T. An arc may now be established between the nonconsumable tungsten electrode E and the work W by scratch start or any other known means. When the arc current reaches a predetermined value weld current relay 14 will energize, closing normally open contacts 14-1 and 14-2. Normally open contact 14-2 of weld current relay 14 is connected in parallel across the series combination of contacts 54-2 and 56-1. When normally open contact 14-2 closes, contacts 54-2 and 56-1 are bypassed to lock in the weld contactor relay 36 and the weld start relay 38. Normally open contact 14-1 of weld current relay 14 when closed will energize post flow time delay relay 54 and will provide a closed circuit for energizing motor M through the contact 56-2 of relay 56.

Hot wire 10 may be brought into operation by releasing pushbutton B deenergizing relay 56. This causes contact 56-2 of relay 56 to return to its normally closed position energizing motor M which in turn will advance hot wire 10 at a predetermined rate toward and into contact with the work W. The hot wire 10 may be stopped at any time by merely depressing pushbutton B and instantly restarted by releasing pushbutton B.

To stop welding the welding operator swings the torch T sharply to break the arc. The loss in welding current deenergizes the weld current relay 14. Relay contacts 14-1 and 14-2 of weld current relay 14 will return to their normally open positions opening up the motor circuit and deenergizing weld contactor relay 36, weld start relay 38 and post flow time delay relay 54. Contact 54-2 of time delay relay 54 will take a fixed period of time to return to its normally closed position preventing the weld contactor relay 36 from instantly reenergizing through contact 56-1 of torch switch transfer relay 56. The closed contact 54-1 of time delay relay 54 will time open maintaining the gas and water solenoids 48 and 50 energized for a predetermined period of time to protect the electrode and torch.

An over voltage protection circuit may be added to supplement the operation of the welding current relay 14 for protection against the possibility of the arc transferring to the torch nozzle. The over voltage protection circuit may consist of any conventional voltage sensitive means such as a relay. In the latter instance, the relay would be coupled directly across the arc and adapted to energize should the arc voltage reach a predetermined level. In this manner, the contacts of the relay could be used either to decouple the line source from the system or to insure deenergization of the weld current relay 14.

Consumable electrode 10 may be inched independent of the foot or hand mode of operation by moving inching switch 70 (shown in FIG. 2) into the inching position for directly energizing motor M. The motor is stopped by removing switch 70 from the inching position.

While the invention has been described in connection with the specific apparatus shown and described, it is apparent that many modifications may be made by those skilled in the art without departing from the underlying scope of the invention. It is, therefore, intended that the appended claims cover all such modifications which fall within the spirit and scope of the present invention.

What is claimed is:

1. An arc welding control system including a manually operated torch having both a nonconsumable electrode and a consumable electrode, the improvement comprising:
   a source of line voltage;
   a power supply circuit having an AC output connected in circuit relation with said consumable electrode and a workpiece and a DC output connected in circuit relation with said nonconsumable electrode and said workpiece;
   a single manually operated switch having a first position and a second position;
   first relay means electrically connected to said switch and being energized when said switch is in said first position;
   contactor means responsive to the energization of said first relay means for electrically coupling said power supply circuit to said source of line voltage;
   second relay means electrically connected to said first relay means and being in circuit relation with said nonconsumable electrode, said second relay means being responsive to a predetermined magnitude of current flow through said nonconsumable electrode for providing an alternate energization path for said first relay means to maintain power to said electrodes; and
   consumable electrode feed means responsive to said switch being in said second position while power is supplied to said electrodes for driving said consumable electrode toward said workpiece whereby said switch controls both said consumable electrode feed means and the application of power to said consumable electrode and nonconsumable electrode respectively.

2. An arc welding control system as defined in claim 1 wherein said switch is a hand operated pushbutton switch located on the outside of said torch.